United States Patent [19]

Mochizuki et al.

[11] Patent Number: 4,814,858
[45] Date of Patent: Mar. 21, 1989

[54] METHOD OF MEASURING COLOR PURITY OF COLOR DISPLAY AND APPARATUS THEREFOR

[75] Inventors: Jun Mochizuki, Yamato; Toshio Asanoh, Yokohama, both of Japan

[73] Assignee: Hitachi, Ltd., Tokyo, Japan

[21] Appl. No.: 178,191

[22] Filed: Apr. 6, 1988

[51] Int. Cl.$^4$ .................. H04N 17/02; H04N 17/04
[52] U.S. Cl. ............................. 358/10; 313/430; 315/368; 324/404; 358/903
[58] Field of Search .............. 358/10, 903; 315/368; 324/121 R, 404; 313/430

[56] References Cited

U.S. PATENT DOCUMENTS

| | | | |
|---|---|---|---|
| 4,636,694 | 1/1987 | De Paolis | 315/368 |
| 4,642,529 | 2/1987 | Penn | 358/10 |
| 4,688,079 | 8/1987 | Fendley | 358/10 |
| 4,709,191 | 11/1987 | Pieri | 324/404 |
| 4,725,763 | 2/1988 | Okuyama | 315/368 |
| 4,754,204 | 6/1988 | Ando | 315/368 |

OTHER PUBLICATIONS

*Toshiba Review*, vol. 36, No. 3 (1981) pp. 241-244 "Automatic Adjustment for CPT Picture Quality-Uno."
*Automizing Technique*, vol. 18, No. 8 (1986), pp. 49-55, "Automatic Measurement for Display Color Purity using Color TV Camera"—Nakao.

*Primary Examiner*—Howard W. Britton
*Attorney, Agent, or Firm*—Antonelli, Terry & Wands

[57] ABSTRACT

Disclosed are a method of measuring the color purity of a color display having phosphors in the shape of dots and an apparatus therefor which are capable of quantitatively measuring the state of the phosphors being irradiated with electron beams with high accuracy. Magnetic field is applied to the color display tube from the outside so as to forcibly move an electron beam deflectively along a straight line and a photograph of the phosphor in this state is taken so as to obtain the configuration (the center position, and the radius or the diameter) of the phosphor from the image of the phosphor. After the two center positions of the electron beams in the positive and negative directions of the external magnetic field are then obtained, the center position of the electron beam under no excitation is obtained as the interior division point.

6 Claims, 5 Drawing Sheets

METHOD OF MEASURING COLOR PURITY OF COLOR DISPLAY AND APPARATUS THEREFOR

BACKGROUND OF THE INVENTION

1. Field of the Invention

The present invention relates to a technique for automatically measuring the picture quality of a color display which has phosphors in the shape of dots and, more particularly, to a method of measuring the color purity of a color display and an apparatus therefor which are capable of quantitatively measuring the state of phosphors being irradiated with electron beams.

2. Description of the Prior Art

The spot diameter of an electron beam is slightly larger than that of a phosphor, and when the phosphor is appropriately irradiated with an electron beam, the luminance distribution in the phosphor varies concentrically in such a manner as to have a large luminance in inverse proportion to the distance from the center. That is, the luminance at the outer peripheral portion of the phosphor is the same over the entire periphery. However, if the phosphor is not appropriately irradiated, the center of the beam spot and the center of the the phosphor do not agree with each other, and a crescent-shaped non-beam irradiation area is sometimes produced at a part of the phosphor. When a crescent-shaped non-beam irradiation area is produced at a part of the phosphor, the direction and degree of the deviation are known by image processing.

As literatures on color purity measurement, there are the paper by Uno and three others: Automatic Adjustment for CPT Picture Quality (pp. 241 to 244 of Toshiba Review Vol. 36, No. 3 (1981)) and the paper by Nakao and one other: Automatic Measurement for Display Color Purity using Color TV Camera (pp. 49 to 55 of Automatizing Technique Vol. 18, No. 8 (1986)). In these papers, however, the object of measurement is a striped phosphor and it is impossible to apply these techniques to a circular phosphor as they are.

When an electron beam deviates and a crescent area is produced at a part of a phosphor, the direction and degree of the deviation are known by image processing, as described above. However, when the entire range of a phosphor 27 is irradiated with an electron beam 26 in the state in which the spot of the electron beam 26 slightly deviates from the phosphor 27, as shown in FIG. 1(a), the direction and the degree of the deviation are not known, and the deviation produces a problem in the inspection of a high-precision color display tube.

SUMMARY OF THE INVENTION

Accordingly, it is an object of the present invention to eliminate the above-described problems in the prior art and to provide a method of measuring the color purity of a color display and an apparatus therefor which are capable of measuring the color purity of circular phosphors, namely, phosphors in the shape of dots with high accuracy.

It is another object of the present invention to provide a method of measuring the color purity of a color display easily and economically and an apparatus therefor.

This aim is achieved by applying magnetic field to a color display tube from the outside so as to forcibly move an electron beam deflectively along a straight line, taking a photograph of the phosphor in this state and obtaining the configuration (the center position, and the radius or the diameter) of the phosphor from the image of the phosphor, obtaining the two center positions of the electron beams in the positive and negative directions of the external magnetic field, and obtaining the center position of the electron beam under no excitation as the interior division point.

By applying external magnetic field in both positive and negative directions, an electron beam is deflectively moved from a phosphor to an extent at which a crescent-shaped non-beam irradiation area is produced. The centers of the electron beams are obtained in the state in which the electron beam is deviated in accordance with the external magnetic field in the positive and negative directions, and the center position of the electron beam under no excitation is obtained as the interior division point of these two center positions. Further, the configuration (the center position, and the radius or the diameter) of the phosphor dot is obtained. Since it is possible to know in advance the configuration of the electron beam as the design values of the color display, it is possible to exactly know the direction and degree of the deviation of the center of the electron beam from the center of the phosphor and the state of the phosphor being irradiated with the electron beam.

The above and other objects, features and advantages of the present invention will become clear from the following description of the preferred embodiments thereof, taken in conjunction with the accompanying drawings.

DESCRIPTION OF THE PREFERRED EMBODIMENTS

An embodiment of the present invention will be explained in the following with reference to the accompanying drawings.

Figure 2:
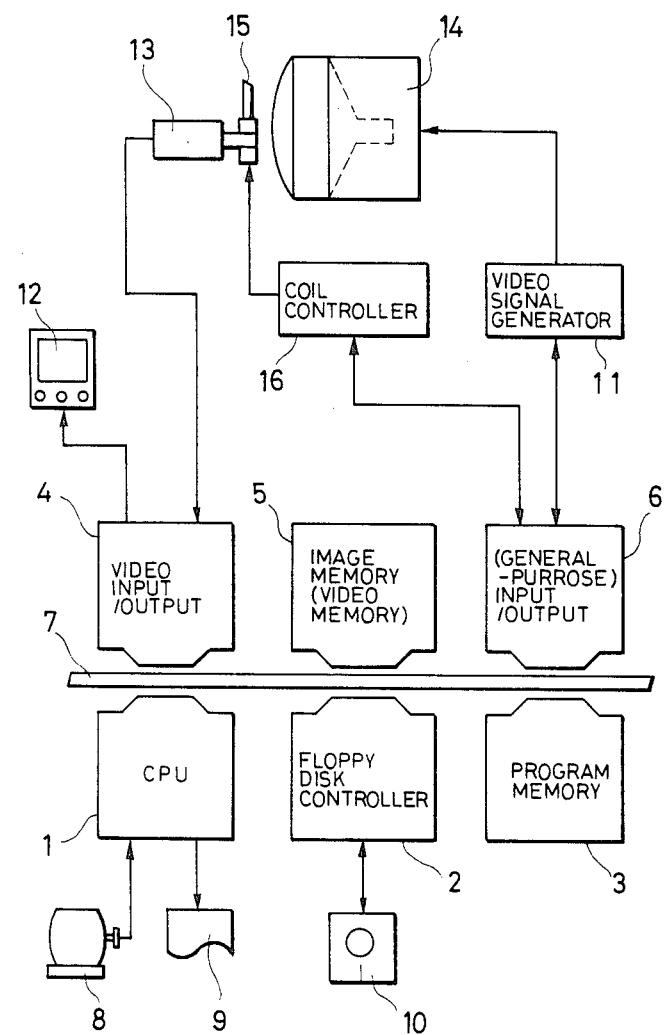
FIG. 2 shows the structure of an embodiment of an apparatus for measuring the picture quality of a color display according to the present invention.

FIG. 2 shows the structure of an embodiment of an apparatus for measuring the picture quality of a color display according to the present invention. The color display picture quality measuring apparatus for measuring a display tube 14 is composed of a central processing unit (CPU) 1, a floppy disk controller 2, a program memory 3, a video input/output circuit 4, an image memory 5 and a general-purpose input/output circuit 6 which are connected to each other through a system bus 7. A CRT 8 for inputting a program, starting or displaying the processed results, and a printer 9 for outputting the processed results and a program list are accommodated in and connected to the CPU 1. A floppy disk driving device 10 for storing a program and data is accommodated in and connected to the floppy disk controller 2. The program memory 3 is used for temporarily storing a program or data. To the video input/output circuit 4, a video signal is inputted from a camera 13, and the processed image is displayed on a monitor 12. The video signal from the camera 13 is converted into various digital values and stored in the image memory 5. The image is displayed on the color display tube 14, which is the object of measurement, in accordance with a signal from a video signal generator 11, which is program controlled by the CPU 1 through the general-purpose input/output circuit 6. A coil 15 for applying external magnetic field so as to forcibly move an electron beam linearly is provided in the vicinity of the camera 13. The current value and the polarity of the coil 15 are controlled by a coil controller 16. The coil controller 16 is program controlled by the CPU 1 through the general-purpose input/output circuit 6.

Although the coil 15 is provided in the vicinity of the camera 13 in this embodiment, it may be disposed in the color display tube 14.

The image displayed on the color display tube 14 by the camera 13 is fetched, and the picture quality of the color display tube 14 is analyzed by an image processor composed of the CPU 1 and the like. By the image processor, the color purity, which is an element of the picture quality of a color display is measured from a raster image of a single color of R, G or B.

Figure 3:
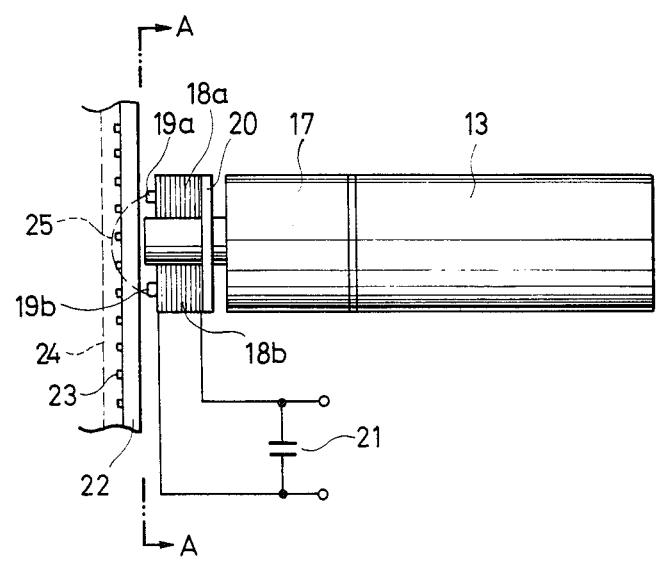
FIG. 3 shows the structure of the measuring head portion used in the apparatus shown in FIG. 2.

FIG. 3 shows the structure of a measuring head portion including the coil 15. Coils 18a and 18b are provided at the end of a lens 17 which is mounted on the camera 13. The coils 18a and 18b have iron cores 19a and 19b, respectively, and are magnetically connected to each other by an iron core 20. A capacitor 21 for preventing a shadow mask 24 from being magnetized is connected in parallel to the coils 18a and 18b. Owing to the above-described structure, the magnetic flux 25 radiated from the coils 18a and 18b distributes to the vicinity of the glass surface 22, the phosphors 23 and the shadow mask 24 of the display tube 14, as shown in FIG. 3. The magnetic flux 25 forcibly moves the electron beam from the normal luminance.

Figure 4:
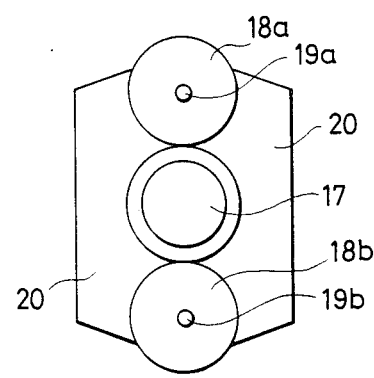
FIG. 4 is an enlarged sectional view of the measuring head portion shown in FIG. 3.

FIG. 4 is an enlarged sectional view of the measuring head portion shown in FIG. 3, taken along the line A—A. The coils 18a and 18b are disposed at the end of the lens 17 with an interval of 180° in the circumferential direction.

Figure 5:
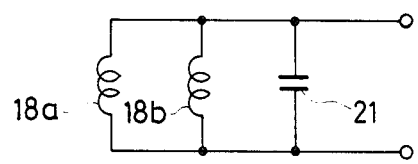
FIG. 5 shows the electrical connection of the coil of the measuring head portion shown in FIG. 3.

FIG. 5 shows the electrical connection of the coils 18a 18b and the capacitor 21. The coils 18a and 18b are connected in parallel to the capacitor 21 for preventing the shadow mask 24 from being magnetized.

Figure 6:
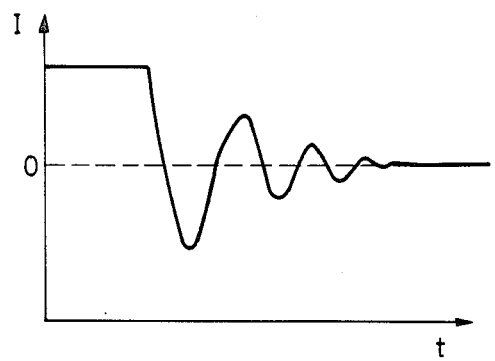
FIG. 6 is a response waveform obtained when the coil current is OFF.

FIG. 6 is a response waveform obtained when the coil current is OFF. Since the capacitor 21 for preventing the shadow mask 24 from being magnetized and the coils 18a and 18b constitute a parallel resonant line, an attenuate oscillatory waveform such as that shown in FIG. 6 is formed. Thus, the shadow mask 24 is prevented from being residually magnetized.

The color purity is obtained by quantitatively measuring the state of the phosphors being irradiated with electron beams. The method thereof will be explained in the following with reference to FIGS. 1(a) to 1(f).

Figure 1A:
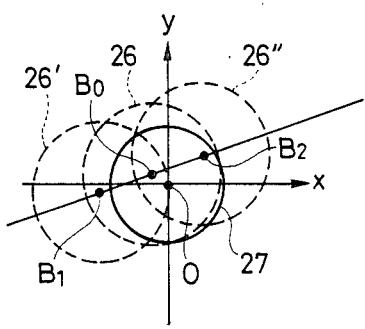
FIGS. 1(a) to 1(f) explain the steps of an embodiment of a method of, measuring the color purity of a color display according to the present invention.

FIG. 1(a) shows the state in which the electron beam 26 moves linearly with respect to the phosphor 27 by applying external magnetic field in the positive and negative directions, and deviates to the positions indicated by the reference numerals 26' and 26'', respectively. In this example, the center position of the electron beam 26 when no external magnetic field is applied is indicated by the symbol $B_0$. In this case, no crescent-shaped non-beam irradiation area is detected in the phosphor 27, thereby making it impossible to distinctly know the color purity. The center positions of the electron beams 26' and 26'' are indicated by the symbols $B_1$ and $B_2$, respectively.

Figure 1B:
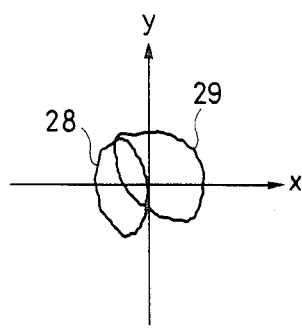
Figure 1C:
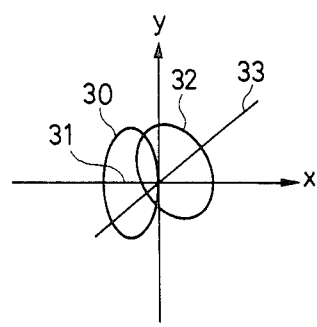

As shown in FIG. 1(b), the contours 28 and 29 of the light emitting portions (the overlapping portions of the phosphor 27 and the electron beam 26' and the phosphor 27 and the electron beam 26'', respectively) in the state in which the electron beam 26 is moved in the positive and negative directions by external magnetic field are first extracted. To the contours 28 and 29, the equation of an ellipse $ay^2+bx^2+cxy+dy+ez+f=0$ is assumed, and the coordinate values (xi, yi) (i = 1 ... n) of the contour nodes are substituted into the polynomial to estimate the coefficients a, b, c, d, e and f. The thus-obtained ellipses equivalent to the contours are indicated by the numerals 30 and 32 in FIG. 1(c). The directions 31 and 33 of the minor axes of the ellipses 30 and 32, respectively, are obtained. If the intersections of the minor axes and the corresponding equivalent ellipses are obtained, there are two intersections for each of the ellipses 30 and 32. If these intersections are called vertices, by measuring the brightness of the vicinity of the two vertices it is known that the brighter vertex is on the phosphor side, and the darker vertex is on the beam side.

More specifically, the contour of a phosphor area is first extracted, and the extracted contour nodes are approximated to an ellipse. The vertices of the minor axis of the approximated ellipse are obtained. The vertices of the minor axis of the approximated ellipse correspond to the phosphor end of the broken phosphor and the beam end. The phosphor end and the beam end can also be obtained by another method. For example, they are obtained as the points on the axis of the extracted contour nodes at which the inertia moment is maximum (principal axis of inertia). In this method, however, the contour is not always stable due to the nonuniformity in the application of phosphors and the adherence of carbon. It is therefore difficult to stably obtain the phosphor end and beam end by this method of using the principal axis of inertia. To solve this problem, it is necessary to give some restricting conditions on the configuration of the phosphor. A distinct condition is that the configuration of the phosphor should be a closed curve. A more important condition is that the curvilinear approximation theory such as regression analysis should be applicable to the closed curve and that the closed curve does not need much amount of calculation. From these reasons, an ellipse is used in the present invention as an approximate closed curve because it is expressed by a polynomial and is not much deviated from the real configuration of the phosphor. The number of the thus-obtained vertices of the minor axes is naturally two per phosphor, so that it is necessary to classify these vertices into phosphor ends and beam ends. For this classification, the finding that it is brighter in the vicinity of the phosphor end than in the vicinity of the beam end is utilized in the present invention. This phenomenon is considered to be due to the fact that BM (black matrix) powder is applied to the phosphor ends for intensifying contrast.

Figure 1D:
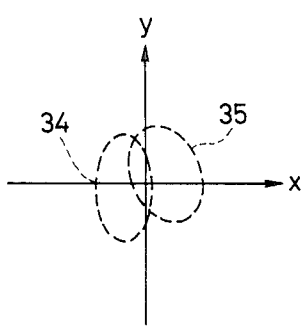
Figure 1E:
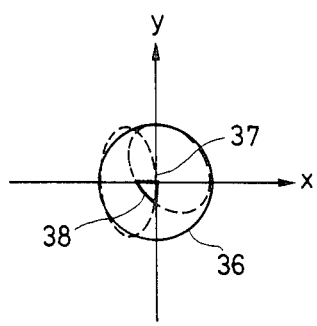
Figure 1F:
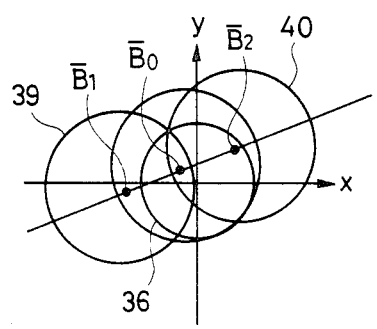

The edges of the phosphor obtained in this way are indicated by the numeral 34 and 35 in FIG. 1(d). On the basis of the edges 34 and 35 of the phosphor, substitution of the polynomial of a circle $x^2+y^2+ax+by+c=0$ is carried out, thereby estimating the configuration (the center position and the radius or the diameter) of the phosphor such as that indicated by the reference numeral 36 in FIG. 1(e) which corresponds to the phosphor 27. Further, the edges 37 and 38 of the beams shown in FIG. 1(e) are substituted to the polynomial of the equation of a circle to estimate the configurations 39 and 40 of the electron beams corresponding to the edges 37 and 38, respectively, as shown in FIG. 1(f). As the interior division point of the estimated centers $\overline{B_1}$ and $\overline{B_2}$ the electron beams obtained in this way, the center $\overline{B_0}$ of the bean under no excitation is estimated.

The interior division ratio is the ratio of the absolute values of the intensities of positive and negative magnetic fields (coil current values), and it is based on the fact that the applied magnetic field (coil current value) is proportional to the amount of deviation of an electron beam.

In this way, it is possible to exactly obtain the direction and the degree of the deviation of the center of the electron beam from the center of the phosphor and the state of the phosphor being irradiated with the electron beam.

Figure 7:
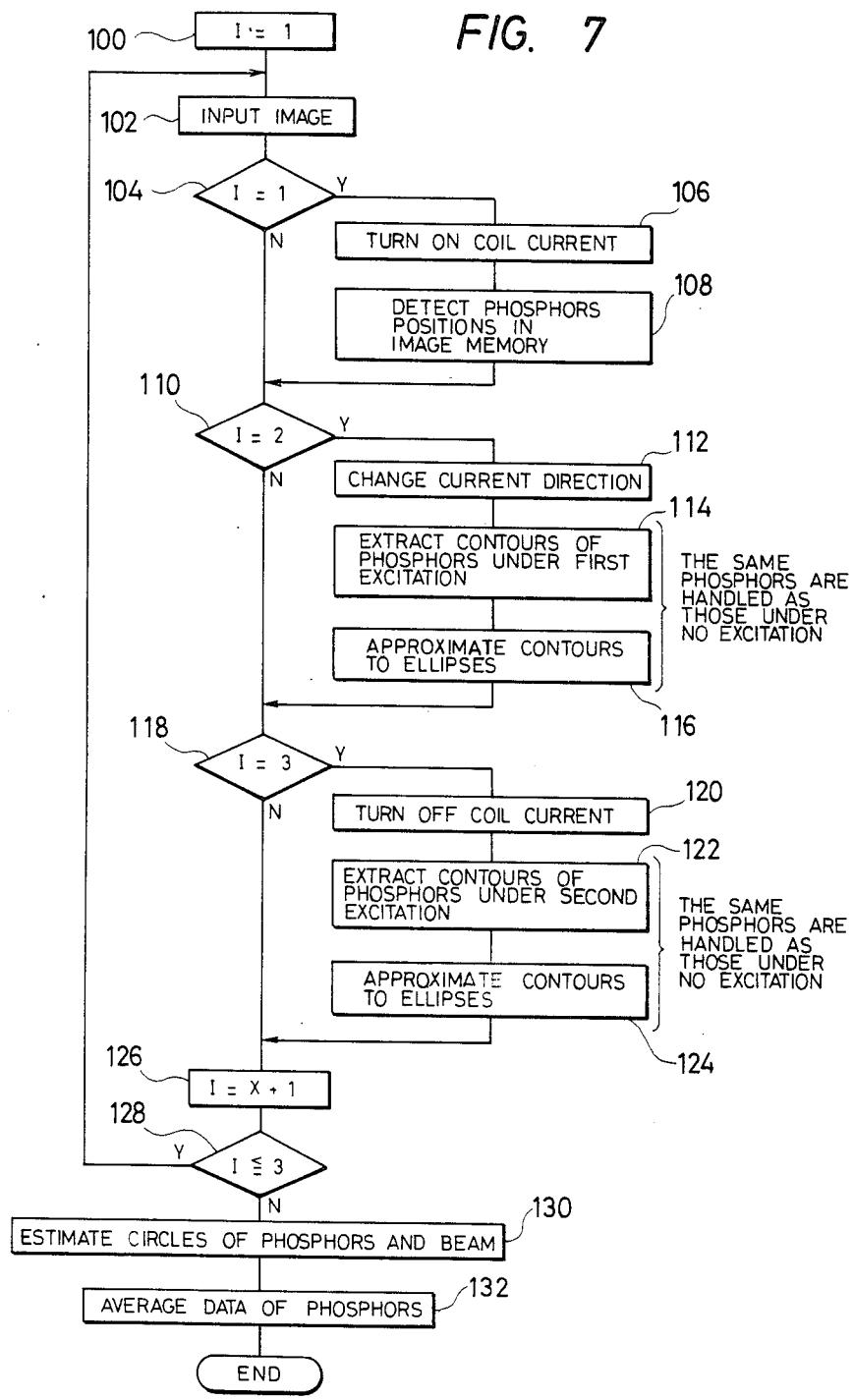
FIG. 7 is a flow chart showing the steps of the processing operation of the apparatus shown in FIG. 2.

FIG. 7 is a flow chart of the processing steps of the CPU 1 shown in FIG. 2. A counter I is first set at 1 (step 100), and the enlarged phosphor image under no excitation is fetched into the image memory 5 (step 102). Thereafter, the current in the positive direction is caused to flow to the coil 15 (steps 104 and 106), and the positions of a plurality of phosphors are detected from the stored dot image under no excitation state (step 108). The counter I is incremented by 1 (step 126), and a phosphor image under first excitation is stored (step 102). Thereafter, current in the negative direction is caused to flow to the coil 15 (steps 110, 112), and the contours of the dots the positions of which have already been detected are extracted from the dot image under first excitation which is stored in the image memory 5 (step 114). The thus-obtained contour nodes are approximated to ellipse (step 116). The counter I is incremented by 1 (step 126), and a phosphor image under second excitation is stored (step 102). Thereafter, the coil current is turned off (steps 118 and 120), and the contours of the phosphors the positions of which have already been detected are extracted from the phosphor image under second excitation which is stored in the image memory 5 (step 122). The thus-obtained contour nodes are approximated to ellipses (step 124). By using the vertices of the minor axes of the thus-obtained approximated ellipses of the phosphors in the first excitation and the second excitation, the circles of the phosphors and the beams are estimated (steps 128 and 130). The data obtained from the plurality of phosphors are averaged, and the average value is taken as the measured value of the purity at the measuring point (132).

Figure 8:
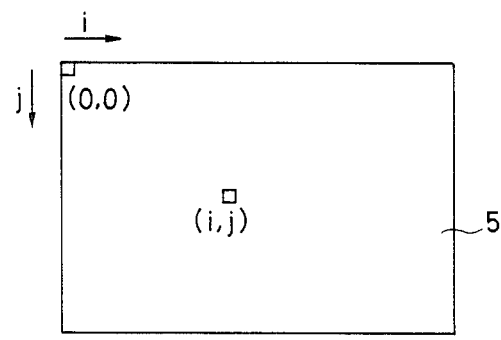
FIG. 8 shows the definition of coordinates on an image memory.

A method of approximating contour nodes to an ellipse or a circle will now be explained. FIG. 8 shows the definition of the coordinates on the image memory 5. The horizontal direction is indicated by the symbol i and the vertical direction by the symbol j. By the multiple regression analysis on the basis of the measured data of the extracted contour nodes $(i_1, j_1) \ldots (i_N, j_N)$, the coefficient al (l = 1 to 6) of the equation of an ellipse $a_1 i^2 + a_3 ij + a_4 i + a_5 j + a_6 = 0$, or the coefficient bm (m = 1 to 3) of an equation of a circle $i^2 + j^2 + b_1 i + b_2 j + b_3 = 0$ is estimated. The algorithm of the multiple regression analysis will be explained in the following.

For executing the multiple regression analysis, the equations of an ellipse and a circle are first modified.

$$j^2 = \alpha_1 i + \alpha_2 j + \alpha_3 ij + \alpha_4 i^2 + \alpha_5 \text{ (ellipse)} \quad (1)$$

$$i^2 + j^2 = \beta_1 i + \beta_2 j + \beta_3 \text{ (circle)} \quad (2)$$

The equation (1) corresponds to the equation of an ellipse, and explanatory variables are $i^2$, $ij$, $i$ and $j$, while explained variable is $j^2$. The equation (2) corresponds to the equation of a circle, and explanatory variables are $i$ and $j$, while explained variable is $i^2+j^2$. The variance and the covariance of each variable are then calculated. If the covariance of the variables i and j is represented by $V_{ij}$, the variance of the variable i by $V_{ii}$, and the average of the variables i ($i_l$ to $i_N$) by $\bar{i}$, variances and covariances in total exist with respect to an ellipse, as shown in the following:

(variance)

$$V_{ii} = \overline{i^2} - \bar{i} \cdot \bar{i} \quad (3)$$

$$V_{jj} = \overline{j^2} - \bar{j} \cdot \bar{j} \quad (4)$$

$$V_{(ij)(ij)} = \overline{i^2 j^2} - \overline{ij} \cdot \overline{ij} \quad (5)$$

$$V_{i^2 i^2} = \overline{i^4} - \overline{i^2} \cdot \overline{i^2} \quad (6)$$

$$V_{j^2 j^2} = \overline{j^4} - \overline{j^2} \cdot \overline{j^2} \quad (7)$$

(covariance)

$$V_{ij} = \overline{ij} - \bar{i} \cdot \bar{j} \quad (8)$$

$$V_{i(ij)} = \overline{i^2 j} - \bar{i} \cdot \overline{ij} \quad (9)$$

$$V_{i i^2} = \overline{i^3} - \bar{i} \cdot \overline{i^2} \quad (10)$$

$$V_{i j^2} = \overline{i j^2} - \bar{i} \cdot \overline{j^2} \quad (11)$$

$$V_{j(ij)} = \overline{i j^2} - \bar{j} \cdot \overline{ij} \quad (12)$$

$$V_{j i^2} = \overline{i^2 j} - \bar{j} \cdot \overline{i^2} \quad (13)$$

$$V_{j j^2} = \overline{j^3} - \bar{j} \cdot \overline{j^2} \quad (14)$$

$$V_{(ij) i^2} = \overline{i^3 j} - \overline{ij} \cdot \overline{i^2} \quad (15)$$

$$V_{(ij) j^2} = \overline{i j^3} - \overline{ij} \cdot \overline{j^2} \quad (16)$$

$$V_{i^2 j^2} = \overline{i^2 j^2} - \overline{i^2} \cdot \overline{j^2} \quad (17)$$

With respect to a circle, variances and covariances 6 in total exist, as shown in the following:

(variance)

$$V'_{ii} = \overline{i^2} - \bar{i} \cdot \bar{i} \quad (18)$$

$$V'_{jj} = \overline{j^2} - \bar{j} \cdot \bar{j} \quad (19)$$

$$V'_{(i^2+j^2)(k^2+j^2)} = \overline{(i^2+j^2)^2} - \overline{i^2+j^2} \cdot \overline{i^2+j^2} \quad (20)$$

(covariance)

$$V'_{ij} = \overline{ij} - \bar{i} \cdot \bar{j} \quad (21)$$

$$\overline{r_j(i^2+j^2)} = \overline{j(i^2 30\, j^2)} - \overline{j \cdot i^2 + j^2} \quad (22)$$

$$\overline{r_j(i^2+j^2)i} = \overline{(i^2+j^2)i - i^2 \cdot i} \quad (23)$$

A correlation matrix is then formed. With respect to an ellipse, a 5×5 matrix Re is formed.

$$Re = \begin{bmatrix} r_{ii} & r_{ij} & r_{i(ij)} & r_{ii2} & r_{ij2} \\ r_{ji} & r_{jj} & r_{j(ij)} & r_{ji2} & r_{jj2} \\ r_{(ij)i} & r_{(ij)j} & r_{(ij)(ij)} & r_{(ij)i2} & r_{(ij)j2} \\ r_{i2i} & r_{i2j} & r_{i2(ij)} & r_{i2i2} & r_{i2j2} \\ r_{j2i} & r_{j2j} & r_{j2(ij)} & r_{j2i2} & r_{j2j2} \end{bmatrix} \quad (24)$$

wherein $$r_{ij} = r_{ji} = \frac{V_{ij}}{\sqrt{V_{ii}V_{jj}}}, \text{ and } r_{ii} = r_{jj} = r_{(ij)(ij)} = r_{i2i2} = r_{j2j2} = 1.$$

A correlation matrix with respect to a circle is a 3×3 matrix Rc.

$$Rc = \begin{bmatrix} r_{ii} & r_{ij} & r_{i(i2+j2)} \\ r_{ji} & r_{jj} & r_{j(i2+j2)} \\ r_{(i2+j2)i} & r_{(i2+j2)j} & r_{(i2+j2)(i2+j2)} \end{bmatrix} \quad (25)$$

wherein $$r_{ij} = r_{ji} = \frac{V_{ij}'}{\sqrt{V_{ii}' V_{jj}'}}, \text{ and } r_{ii} = r_{jj} = r_{(i2+j2)(i2+j2)} = 1.$$

The thus-obtained correlation matrices are computed by an elimination method. The correlation matrix of an ellipse is first computed by an elimination method with the element of the first row and first column, namely, element (1, 1) (hereinunder referred to simply as "element (1, 1)") as a pivot. The correlation matrix is subsequently computed by an elimination method four times in total with the elements (2, 2), (3, 3) and (4, 4) as a pivot in that order. The correlation matrix of a circle is computed by an elimination method twice with the elements (1, 1) and (2, 2) as a pivot in that order. The results are as follows:

$$Re = \begin{bmatrix} \ldots \hat{\alpha}_1' \\ \ldots \hat{\alpha}_2' \\ \ldots \hat{\alpha}_3' \\ \ldots \hat{\alpha}_4' \\ \ldots \end{bmatrix} \quad (26)$$

$$Rc = \begin{bmatrix} \ldots \hat{\beta}_1' \\ \ldots \hat{\beta}_2' \\ \ldots \end{bmatrix} \quad (27)$$

If the estimated values of the coefficients $\alpha_1, \ldots, \alpha_4$ of the equation of an ellipse are represented by $\hat{\alpha}_1, \ldots, \hat{\alpha}_4$, respectively, and the estimated values of the coefficients $\beta_1$, and $\beta_2$ of the equation of a circle are represented by $\hat{\beta}_1$ and $\hat{\beta}_2$, these values are calculated in the following way:

$$\hat{\alpha}_1 = \hat{\alpha}_1' \frac{V_{j2j2}}{V_{ii}}, \quad \hat{\alpha}_2 = \hat{\alpha}_2' \frac{V_{j2j2}}{V_{jj}}, \quad (28)$$

$$\hat{\alpha}_3 = \hat{\alpha}_3 \frac{V_{j2j2}}{V_{(ij)(ij)}}, \quad \hat{\alpha}_4 = \hat{\alpha}_4' \frac{V_{j2j2}}{V_{i2i2}}$$

$$\hat{\beta}_1 = \hat{\beta}_1' \frac{V_{(i2+j2)(i2+j2)}}{V_{ii}'}, \quad (29)$$

$$\hat{\beta}_2 = \hat{\beta}_2' \frac{V_{(i2+j2)(i2+j2)}}{V_{jj}'}$$

The constant terms $\alpha_5$ and $\beta_3$ are as follows:

$$\hat{\alpha}_5 = \overline{j^2} - \hat{\alpha}_1 \overline{i} - \hat{\alpha}_2 \overline{j} - \hat{\alpha}_3 \overline{ij} - \hat{\alpha}_4 \overline{i^2} \quad (30)$$

$$\hat{\beta}_3 = \overline{i^2+j^2} - \hat{\beta}_1 \overline{i} - \hat{\beta}_2 \overline{j} \quad (31)$$

In this way, it is possible to solve all the equations of an ellipse and a circle by estimation.

As described above, although it is impossible to measure the color purity when the deviation of an electron beam from a phosphor is small and there is no non-beam irradiation area in the phosphor in the prior art, this embodiment of the present invention enables exact measurement even in this state.

More specifically, according to the present invention, in a color display tube having phosphors in the shape of dots, even in the case in which the deviation of an electron beam from a phosphor is small, it is possible to exactly obtain the direction and amount of the deviation and the state of the phosphor of being irradiated with the electron beam, thereby enabling the highly accurate measurement of the color purity.

In the above explanation, external magnetic field is applied in both positive and negative directions, but when a crescent-shaped non-beam irradiation area is produced on a phosphor, it is possible to obtain the direction and degree of the deviation and correct the deviation by applying external magnetic field only in one direction so as to produce the non-beam irradiation area in the opposite direction.

In this case, it is also possible to obtain the positional deviation with high accuracy by further applying external magnetic field in positive and negative directions after the correction.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of measuring the color purity of a color display comprising the steps of:
    applying magnetic field to a color display tube so as to forcibly move an electron beam along a straight line;
    obtaining the configuration of a phosphor from the image of said phosphor obtained by taking a photograph thereof by a camera;
    obtaining the center positions of said electron beam in the state of being excited in both positive and negative directions; and
    obtaining the center position of said electron beam under no excitation as the interior division point of said center positions.

2. A method of measuring the color purity of a color display by storing the image of a phosphor by taking a photograph thereof as gradation data and processing said image so as to measure the state of said phosphor being irradiated with an electron beam, said method comprising the steps of:

taking a photograph of said phosphor by a camera in the state in which magnetic field is applied to a color display tube in positive and negative positions so as to forcibly move an electron beam along a straight line;

detecting the edges of said phosphor and said electron beam by substituting an equivalent ellipse into the extracted contours of said phosphor and said electron beam;

estimating the center positions and the configurations of said phosphor and said electron beam from the respective edges; and obtaining the center positions and the configurations of said electron beam in the state in which external magnetic field is applied to said electron beam in positive and negative positions, and obtaining the center position of said electron bean under no excitation with respect to the center position of said phosphor as the point obtained by the interior division of the distance of said center positions of said electron beam by the ratio of the absolute values of the intensities of magnetic field in positive and negative positions so as to obtain the state of said phosphor being irradiated with said electron beam.

3. A measuring method according to claim 2, wherein an equivalent circle is substituted into the contours of said phosphor and said electron beam on the basis of said detected edges when the center positions and the configurations of said phosphor and said electron beam are estimated.

4. A method of measuring the color purity of a color display comprising the steps of:

extracting the contour of the image of a phosphor which has been obtained by taking a picture thereof by a camera in the state in which magnetic field is applied to a color display tube in one direction and is stored in an image memory;

approximating the contour nodes obtained to an ellipse;

extracting the contour of the image of said phosphor which has been obtained by taking a picture thereof in the state in which magnetic field is applied to said color display tube in the opposite direction to said direction and is stored in said image memory;

approximating the contour nodes obtained to an ellipse;

estimating the circle of said phosphor and the circle of said electron beam by using the vertices of the minor axes of the two approximated ellipses obtained under excitation in the two directions; and obtaining the deviation of the center of said electron beam from the center of said phosphor.

5. A measuring method according to claim 4, wherein in the measurement of said phosphor, the positions of a plurality of phosphors in the visual field of said camera are detected from images of said phosphors under no excitation;

obtaining the deviation of electron beams from the detected position of said plurality of phosphors; and averaging the data obtained so as to measure the color purity.

6. An apparatus for measuring the color purity of a color display comprising:

a color display tube which is the object of measurement;

means for applying external magnetic field to said color display tube so as to forcibly move an electron beam linearly;

photographing means for fetching the image displayed on said color display tube; and image processing means for obtaining the configuration of a phosphor from the image of said phosphor obtained by said photographing means, obtaining the position of said electron beam in the state in which said external magnetic field is applied, and obtaining the deviation of said electron beam from said phosphor.

* * * * *